United States Patent Office 3,351,618
Patented Nov. 7, 1967

3,351,618
POLYMERIZATION PRODUCTS OF CARBONAMIDES (CONTAINING SULFONAMIDO GROUPS) OF α,β-ETHYLENICALLY UNSATURATED ALIPHATIC CARBOXYLIC ACIDS
Rosemarie Toepfl, Basel, and Arthur Maeder, Therwil, Switzerland, assignors to Ciba Limited, Basel, Switzerland, a company of Switzerland
No Drawing. Filed Apr. 5, 1965, Ser. No. 445,705
Claims priority, application Switzerland, Apr. 17, 1964, 5,022/64
18 Claims. (Cl. 260—79.7)

The present invention provides new polymerization products from (a) carbonamides (containing sulfonamido groups) of α,β-ethylenically unsaturated aliphatic carboxylic acids of the general formula 1(a) 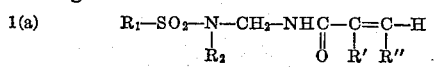

or

1(b) 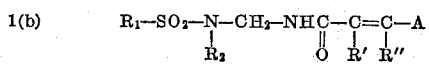

or

1(c) 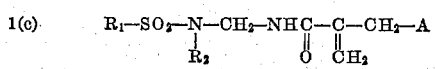

where A stands for

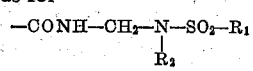

—COOH, CONH$_2$ or CONHCH$_2$OR''', R$_1$ for an unsubstituted or substituted alkyl, aryl, aralkyl, cycloalkyl or heterocyclic radical, R$_2$ for hydrogen or an unsubstituted or substituted alkyl, aryl, aralkyl, cycloalkyl or heterocyclic radical, and R$_1$, R$_2$ and —SO$_2$— togther with N may also form a heterocyclic radical and where R' and R'' each represents a hydrogen atom or the methyl group and R''' a hydrogen atom or an alkyl radical containing 1 to 4 carbon atoms, especially a methyl group, and, if desired, (b) other copolymerizable, ethylenically unsaturated monomers.

The monomers of the Formulae 1(a) to 1(c) are derived from α,β-unsaturated amides of mono- or dicarboxylic acids containing 3 to 5 carbon atoms.

The compounds of the Formula 1(a) are primarily derivatives of acrylic, methacrylic or crotonic acid; the compounds of the Formula 1(b) are derivatives of maleic, citraconic, fumaric or mesaconic acid, and the compounds of the Formula 1(c) are derivatives of itaconic acid.

Of special value are those monomeric compounds of the Formula 1(a) in which R$_1$ represents an unsubstituted or substituted alkyl, aryl or aralkyl radical, R$_2$ an alkyl radical containing up to 4 carbon atoms or preferably a hydrogen atom, and R' and R'' each stands for a hydrogen atom or a methyl group.

The monomers of the Formulae 1(a) to 1(c) are obtained when (a) an N-methylolamide of an α,β-unsaturated mono-carboxylic or dicarboxylic acid is reacted with a sulfonamide of the following Formula 2 accompanied by elimination of water, or (b) an amide of an α,β-unsaturated monocarboxylic or dicarboxylic acid is reacted with an N-methylolsulfonamide of a sulfonamide of the following Formula 2, accompanied by elimination of water.

The compounds of the Formulae 1(a) to 1(c) are preferably manufactured as under (a) above, that is to say by condensing the N-methylolamide with the sulfonamide.

Both the condensation as under (a) and under (b) above is advantageously performed in an organic solvent such as benzene or acetone at a temperature ranging from 20 to 100°, preferably from 40 to 90° C. The concentration of the final product in the solution is 5 to 95%. To isolate the condensation product the water may be removed by azeotropic distillation.

The sulfonamides to be used as starting materials correspond to the general formula (2)    R$_1$—SO$_2$—NH—R$_2$ where R$_1$ stands for an unsubstituted or substituted alkyl, aryl or aralkyl, cycloalkyl or heterocyclic radical and R$_2$ for hydrogen or an unsubstituted or substituted alkyl, aryl, aralkyl, cycloalkyl or heterocyclic radical, and R$_1$, R$_2$ and —SO$_2$— together with N may also form a heterocycle. Preferably, R$_1$ stands for a possibly substituted alkyl or aryl radical and R$_2$ for a hydrogen atom.

As relevant examples there may be mentioned: methanesulfonamide CH$_3$SO$_2$NH$_2$, propanesulfonamide $$CH_3CH_2CH_2SO_2NH_2$$

benzylsulfonamide C$_6$H$_5$CH$_2$SO$_2$NH$_2$, benzenesulfonamide C$_6$H$_5$SO$_2$NH$_2$, para-toluenesulfonamide $$CH_3C_6H_4SO_2NH_2$$

n-butyl-para-toluenesulfonamide $$CH_3C_6H_4SO_2NH(CH_2)_3CH_3$$

3-pyridinesulfonamide C$_5$H$_4$NSO$_2$NH$_2$, N-acetyl-sulfanilamide CH$_3$CONH—C$_6$H$_4$—SO$_2$NH$_2$, N-acetyl-sulfapyridine CH$_3$CONH—C$_6$H$_4$SO$_2$NH—C$_6$H$_5$N and ortho-sulfobenzoic imide

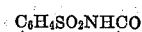

The condensation of N-methylolacrylamide with para-toluenesulfonamide may be represented by the following equation:

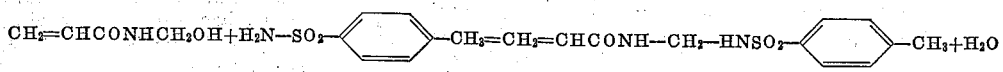

The monomeric compounds of the Formulae 1(a) to 1(c) may be polymerized in solution or in emulsion and in the presence of catalysts that give off free radicals or act ionically, with themselves, with another compound of the Formulae 1(a) to 1(c), or with other polymerizable compounds, whereupon they form as a rule linear polymers. Depending on the starting materials chosen for the polymerization they give rise to linear polymer homologues, unipolymers or linear multipolymers. Polymer homologues are obtained by using exclusively identical monomer units, unipolymers by using two or more monomer units that correspond exclusively to the general Formulae 1(a) to 1(c), and multipolymers by using at least one monomer unit of the general Formulae 1(a) to 1(c) and at least one other polymerizable monomer. As examples of monomeric compounds suitable for the manufacture of multipolymers there may be mentioned:

(a) vinyl esters of organic acids, e.g. vinyl acetate, formate, butyrate and benzoate,
(b) vinylalkyl ketones such as vinylmethyl ketone,
(c) vinyl halides such as vinylchloride, vinylfluoride and vinylidenechloride, (d) vinylaryl compounds such as styrene and substituted styrenes, such as α-methylstyrene, (e) derivatives of the acrylic acid series such as acrylonitrile or acrylamide, or the methacrylamide and preferably the N-mono-substituted or N,N-disubstituted derivatives such as N,N-dihydroxyethyl-acrylamide, N,N-diethyl-acrylamide, N-tertiary butyl-acrylamide and N-cyclohexyl-acrylamide; also N-methylol-acrylamide and N-methylol-methacrylamide and the corresponding alkyl ethers. Further suitable are basic amides such as diethylaminopropyl-acrylamide and its quaternation products, and (f) above all esters of the acrylic acid series, such as esters of acrylic, methacrylic, α-chloracrylic, crotonic, maleic, fumaric or itaconic acid and mono-alcohols or di-alcohols containing 1 to 18 carbon atoms or phenols, e.g. ethyl acrylate, glycidyl acrylate, butyl acrylate, acrylic acid monoglycol ester or dodecyl acrylate; furthermore (g) free, aliphatic unsaturated monocarboxylic or dicarboxylic acids, such as acrylic, methacrylic, crotonic, itaconic, maleic or fumaric acid.

Furthermore, there may be used polymerizable olefines such as isobutylene, butadiene or 2-chlorobutadiene.

The following are preferably used: Vinylchloride, vinylidenechloride, acrylic acid, methacrylic acid; the salts of acrylic, methacrylic, fumaric or itaconic acid such as calcium acrylate, and the esters of these acids such as acrylic acid ethyl ester, butyl ester, glycidyl ester, monoglycol ester; also acrylamide, methacrylamide, N-methylol-acrylamide, N-methylol-acrylamide methyl ether, N-tertiary butyl-acrylamide, vinyl acetate, acrylonitrile, styrene and butadiene.

Particularly valuable multipolymers are obtained by polymerizing (1) methylene-N-acrylamide-N'-methanesulfonamide or methylene-N-acrylamide-N'-paratoluenesulfonamide with (2) acrylonitrile, vinylidenechloride, vinyl acetate, styrene or diethylaminopropyl-acrylamide and with (3) an ester of the acrylic acid series.

As a rule, the polymers consist of 4 to 100% of a compound of the general Formula 1 and 96 to 0% of another compound. Depending on the polymerization conditions chosen, the polymers are obtained as liquids, gels, emulsions or granulates. For certain purposes, for instance coatings, particularly valuable polymers are obtained from 4 to 8% of a compound of the Formula 1 and 96 to 92% of at least one other copolymerizable compound.

The polymers may be used as such or in solution or in emulsion. They are suitable for the manufacture of shaped articles, coatings on non-porous materials such as metal, glass or wood, binders, especially for pigments, or for the manufacture of impregnations or coatings on porous materials such as textiles, paper or leather. Particularly valuable are the impregnations produced on textile materials from natural, modified or fully synthetic fibers such as cotton, viscose rayon, cellulose-2½-acetate, cellulose triacetate, polyesters, acrylonitrile or nylon. The polymers can also be used in combination with other polymers or pre-condensates such as epoxides, aminoplasts, e.g. condensation products of formaldehyde with urea, cyanamide, dicyandiamide and especially melamine. For conversion into the insoluble state it is advantageous to heat the polymer to a temperature within the range from 100 to 180° C.

Parts and percentages in the following examples are by weight.

MANUFACTURE OF THE MONOMERS

Monomer A

Condensing methylol-acrylamide with methylanesulfonamide

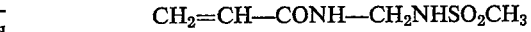

A mixture of 23.75 parts of methanesulfonamide (0.25 mol), 25.25 parts of methylol-acrylamide (0.25 mol), 0.5 part of hydroquinone, 0.2 part of para-toluenesulfonic acid and 200 parts of benzene is reacted at the boil, the water formed being removed by means of a water separator. The reaction product is obtained by expelling the benzene. It forms a clear, viscous, water-soluble oil. Yield: 90.0%.

*Analysis.*—Percent calculated: C, 33.7; H, 5.6; N, 15.7. Percent found: C, 33.4; H, 5.9; N, 15.2.

Monomer B

Condensing methylol-acrylamide with para-toluenesulfonamide

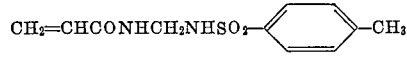

A mixture of 85.5 parts of para-toluenesulfonamide (0.5 mol), 50.5 parts of methylol-acrylamide (0.5 mol), 0.5 part of hydroquinone, 0.6 part of para-toluenesulfonic acid and 260 parts of benzene is reacted at the boil. The water formed is removed with the aid of a water separator. The reaction product is crystalline and settles out. It is obtained by being suctioned off. Melting point: 158 to 159° C. Yield: 94.5%.

*Analysis.*—Percent calculated: C, 51.95; H, 5.55; N, 11.02. Percent found: C, 51.72; H, 5.64; N, 10.92.

Monomer C

Condensing methylol-acrylamide with N-butyl-para-toluenesulfonamide

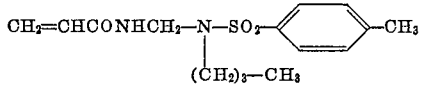

A mixture of 22.7 parts of N-butyl-para-toluenesulfonamide (0.1 mol), 10.1 parts of methylol-acrylamide (0.1 mol), 0.2 part of hydroquinone, 0.1 part of paratoluenesulfonic acid and 200 parts of benzene is reacted at the boil. The water formed is removed with the aid of a water separator. The reaction mixture is obtained by removing the benzene. A clear viscous oil is obtained which is soluble in alcohol. Yield: 90.5%.

*Analysis.*—Percent calculated: C, 58.04; H, 7.14; N, 9.02. Percent found: C, 57.70; H, 7.20; N, 9.00.

Monomer D

Condensing methylol-methacrylamide with methanesulfonamide

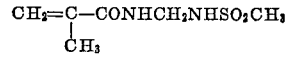

A mixture of 34.5 parts of methylol-methacrylamide (0.3 mol), 28.5 parts of methanesulfonamide, (0.3 mol), 0.3 part of hydroquinone, 0.3 part of para-toluenesulfonic acid and 200 parts of benzene is reacted at the boil.

The water formed is removed with the aid of a water separator. The reaction product is obtained on removal of the benzene. It is a crystalline mass which is recrystallized from ethyl acetate. Yield: 88.0%. Melting point: 107 to 108° C.

*Analysis.*—Percent calculated: C, 37.49; H, 6.29; N, 14.57. Percent found: C, 37.60; H, 6.10; N, 14.30.

Monomer E

Condensing methylol-methacrylamide with para-toluenesulfonamide

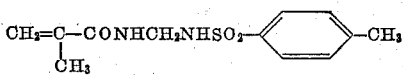

A mixture of 57.5 parts of methylol-methacrylamide (0.5 mol), 85.5 parts of para-toluenesulfonamide (0.5 mol), 0.3 part of hydroquinone, 0.6 part of para-toluenesulfonic acid and 200 parts of benzene is reacted at the boil. The water formed is removed with the aid of a water separator. The crystalline reaction product settles out; it is suctioned off and recrystallized from ethyl acetate. Yield: 94.3%. Melting point: 151 to 152° C.

*Analysis.*—Percent calculated: C, 53.71; H, 6.01; N, 10.44. Percent found: C, 53.60; H, 6.20; N, 10.30.

Monomer F

Condensing methylol-crotonamide with methanesulfonamide

A mixture of 23 parts of methylol-crotonamide (0.2 mol), 19 parts of methanesulfonamide (0.2 mol), 0.1 part of hydroquinone, 0.3 part of para-toluenesulfonic acid and 200 parts of acetone is reacted at 50° C. The reaction product is obtained on removal of the acetone; it forms a crystalline mass which is recrystallized from ethyl acetate. Yield: 86%. Melting point: 124 to 125° C.

*Analysis.*—Percent calculated: C, 37.49; H, 6.29; N, 14.57. Percent found: C, 37.80; H, 6.20; N, 14.20.

Monomer G

Condensing methylol-acrylamide with chloromethanesulfonamide

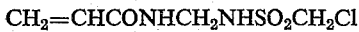

A mixture of 20.2 parts of methylolacrylamide (0.2 mol), 25.9 parts of chloromethanesulfonamide (0.2 mol), 0.1 part of hydroquinone, 0.3 part of para-toluenesulfonic acid and 200 parts of acetone is reacted at 50° C. The reaction product is obtained by removing the acetone. Yield: 86.8%. Melting point: 82–83° C.

*Analysis.*—Percent calculated: C, 28.24; H, 4.27; N, 13.17; Cl, 16.67. Percent found: C, 27.90; H, 4.20; N, 12.90; Cl, 16.20.

Monomer H

Condensing methylol-acrylamide with benzylsulfonamide

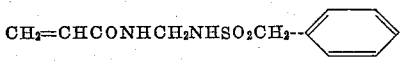

A mixture of 20.2 parts of methylolacrylamide (0.2 mol), 34.2 parts of benzylsulfonamide (0.2 mol), 0.1 part of hydroquinone, 0.3 part of para-toluenesulfonic acid and 200 parts of acetone is reacted at 50° C. The crystalline reaction product settles out. Yield: 88.5%. Melting point: 164 to 165° C.

*Analysis.*—Percent calculated: C, 51.95; H, 5.55; N, 11.02. Percent found: C, 51.90; H, 5.70; N, 11.00.

Example 1

A pre-emulsion is prepared by vigorously shaking 95 parts of n-butyl acrylate, 5 parts of methylene-N-acrylamide - N' - methanesulfonamide [condensation product from methanesulfonamide and methylol-acrylamide= Monomer A], 2.5 parts of sodium α-hydroxyoctadecanesulfonate, 2.5 parts of sodium laurylsulfate, 0.5 part of triethanolamine and 143 parts of water. A flask equipped with reflux condenser, nitrogen inlet tube and stirrer is scavenged with nitrogen and charged with half of this pre-emulsion which is then heated to an internal temperature of about 50° C. A solution of 0.2 part of sodium bisulfite in 2 parts of water and then a solution of 0.05 part of ammonium persulfate in 1.5 parts of water are added, whereupon the temperature rises and the remainder of the pre-emulsion is dropped in within 20 minutes. During the dropwise addition a solution of 0.05 part of ammonium persulfate in 1.5 parts of water is added and this addition is prepared on completion of the dropwise addition 8 more times at intervals of 30 minutes. The batch is then further polymerized for 2 hours, to yield a thinly liquid, fine emulsion containing 39.7% of polymer (theory: 40.0%). Films cast from this emulsion and dried in air are soft, clear and soluble in trichloroethylene. After having been cured for 5 minutes at 130° C., they have become insoluble in boiling trichloroethylene.

Example 2

A pre-emulsion is prepared by vigorously shaking 80 parts of n-butyl acrylate, 15 parts of vinylidenechloride, 5 parts of methylene-N-acrylamide-N'-para-toluenesulfonamide [condensation product from methylol-acrylamide and para-toluenesulfonamide=Monomer B], 20 parts of acetone, 2.5 parts of sodium phenyldodecylsulfonate, 2.5 parts of sodium laurylsulfate, 0.5 part of triethanolamine and 160 parts of water. A flask equipped with reflux condenser, nitrogen inlet tube, thermometer and stirrer is scavenged with nitrogen, and one half of this pre-emulsion is introduced in it and heated to an internal temperature of about 47° C. A solution of 0.2 part of sodium bisulfite in 2 parts of water and a solution of 0.05 part of ammonium persulfate in 1.5 parts of water are added, whereupon the temperature rises and the remainder of the pre-emulsion is dropped in within 25 minutes. During this dropwise addition a solution of 0.05 part of ammonium persulfate in 1.5 parts of water is added and this addition is repeated on completion of the dropwise addition 8 more times at intervals of 30 minutes, and the batch is further polymerized for 5 hours, to yield a thinly liquid, fine emulsion containing 33.6% of polymer (theory: 35.0%). Films cast from this emulsion and dried in air are soft, clear and soluble in trichloroethylene. After having been cured for 5 minutes at 130° C., they have become insoluble in boiling trichloroethylene.

Example 3

A pre-emulsion is prepared by vigorously shaking 93 parts of vinyl acetate, 5 parts of methylene-N-acrylamide-N'-para-toluenesulfonamide (=Monomer B), 2 parts of calcium acrylate, 2.5 parts of sodium α-hydroxy-octadecanesulfonate, 2.5 parts of sodium laurylsulfate, 20 parts of acetone and 211 parts of water. One half of this pre-emulsion is then introduced into a flask equipped with reflux condenser, nitrogen inlet tube and stirrer, after having scavenged it with nitrogen, and heated to an internal temperature of about 60° C. When a solution of 0.2 part of sodium bisulfite in 2 parts of water and a solution of 0.05 part of potassium persulfate in 1.5 parts of water and added, the temperature rises, whereupon the remainder of the pre-emulsion is added dropwise within 40 minutes. During this dropwise addition two additions are made of 0.5 part of potassium persulfate in 1.5 parts of water and this addition is repeated after completion of the dropping-in 7 more times at intervals of 30 minutes. The batch is then further polymerized for 4 hours, to yield a thinly liquid, fine emulsion containing 28.7% of polymer (theory: 30.0%).

Example 4

A pre-emulsion is prepared by vigorously shaking 90 parts of vinyl acetate, 3 parts of diethylaminopropyl-acrylamide quaternated with chloroacetamide, 5 parts of methylene-N-acrylamide - N' - para-toluenesulfonamide (=Monomer B), 5 parts of lauroyl amidopropyl trimethyl ammonium methosulfate, 2 parts of an adduct of 9 mols of ethylene oxide with 1 mol of nonylphenol, 20 parts of acetone and 231 parts of water. One half of this pre-emulsion is introduced into a flask equipped with reflux condenser, nitrogen inlet tube, thermometer and agitator, which has been previously scavenged with nitrogen, and heated to an internal temperature of about 60° C. On addition of a solution of 0.2 part of sodium bisulfite in 2 parts of water and of a solution of 0.1 part of potassium persulfate in 3 parts of water, the temperature rises, whereupon the remainder of the pre-emulsion is dropped in within 30 minutes. During this drop-wise addition a solution of 0.05 part of potassium persulfate in 1.5 parts of water is added and this addition is repeated after the dropping-in 7 more times at intervals of 30 minutes. The batch is further polymerized for 2 hours, to yield a thinly liquid, fine emulsion containing 28.4% of polymer (theory: 28.6%).

Example 5

A pre-emulsion is prepared by vigorously shaking 84 parts of vinylidenechloride, 11 parts of methyl-acrylate, 5 parts of methylene-N-acrylamide-N'-para-toluenesulfonamide (=Monomer B), 20 parts of acetone, 2.5 parts of sodium phenyldodecylsulfonate, 2.5 parts of sodium laurylsulfate, 1.0 part of triethanolamine and 214 parts of water. One half of this pre-emulsion is entered in a flask equipped with reflux condenser, thermometer, nitrogen inlet tube and stirrer, which has previously been scavenged with nitrogen, and heated to an internal temperature of about 35° C. A solution of 0.2 part of sodium bisulfite in 2 parts of water and a solution of 0.05 part of ammonium persulfate in 1.5 parts of water are added, whereupon the temperature rises and the remainder of the pre-emulsion is dropped in within 20 minutes. On completion of the dropping-in 9 further additions each of a solution of 0.05 part of ammonium persulfate in 1.5 parts of water are made at intervals of 30 minutes, and the batch is then further polymerized for 5 hours, to yield a thinly liquid, fine emulsion containing 28.6% of polymer (theory: 29.8%).

Example 6

A pre-emulsion is prepared by vigorously shaking 65 parts of n-butyl acrylate, 30 parts of acrylonitrile, 5 parts of methylene-N-acrylamide-N'-para - toluenesulfonamide (=Monomer B), 50 parts of etherified polymethylolmelamine with polyethyleneglycol 4000 and n-butanol, 20 parts of acetone and 122 parts of water. One half of this pre-emulsion is entered in a flask, which has been scavenged with nitrogen and is equipped with reflux condenser, nitrogen inlet tube, thermometer and stirrer, and heated to an internal temperature of about 45° C. A solution of 0.2 part of sodium bisulfite in 2 parts of water and a solution of 0.05 part of ammonium persulfate in 1.5 parts of water are added, whereupon the temperature rises and the remainder of the pre-emulsion is dropped in within 30 minutes. On completion of the dropping-in 9 additions are made each of a solution of 0.05 part of ammonium persulfate in 1.5 parts of water, and the batch is further polymerized for 1 hour, to yield a thinly liquid, fine emulsion having a polymer content of 46.7% (theory: 48.7%).

Films cast from this emulsion and dried in air are soluble in trichloroethylene. After having been cured for 5 minutes at 130° C., they have become insoluble in boiling trichloroethylene.

Example 7

A solution of 34 parts of vinyl acetate, 11.5 parts of n-butyl acrylate, 9 parts of methylene-N-acrylamide-N'-para-toluenesulfonamide (=Monomer B) in 75 parts of ethyl acetate is heated in a flask, which has been previously scavenged with nitrogen and is equipped with reflux condenser, nitrogen inlet tube, thermometer and stirrer, to an internal temperature of about 60° C. On addition of 0.2 part of benzoyl peroxide the temperature rises, and a solution of 34 parts of n-butyl acrylate 11.5 parts of vinyl acetate and 75 parts of ethyl acetate is dropped in within 25 minutes. During this dropping-in 0.2 part of benzoyl peroxide is added and after the dropping-in this addition is repeated 3 more times at intervals of 30 minutes. 1 hour after all has been dropped in the bath temperature is raised by 10° C., and the batch is further polymerized for 7 hours, to yield a medium viscous, slightly turbid resin solution containing 38.6% of polymer (theory: 40.3%).

Films cast from this resin solution and dried in air are soluble in trichloroethylene. After having been cured for 5 minutes at 130° C. they have become insoluble in boiling trichloroethylene but they swell slightly in it.

Example 8

A pre-emulsion is prepared by vigorously shaking 95 parts of n-butyl acrylate, 5 parts of methylene-N-acrylamide - N' - (N' - n - butyl)-para-toluenesulfonamide [condensation product from n-butyl-para-toluenesulfonamide and methylolacrylamide=Monomer C], 2.5 parts of sodium α-hydroxyoctadecanesulfonate, 2.5 parts of sodium laurylsulfate, 0.5 part of triethanolamine and 143 parts of water. One half of this pre-emulsion is then entered in a flask which has previously been scavenged with nitrogen and is equipped with reflux condenser, nitrogen inlet tube, thermometer and stirrer, and heated to an internal temperature of about 50° C. On addition of a solution of 0.2 part of sodium bisulfite in 2 parts of water and a solution of 0.05 part of potassium persulfate in 1.5 parts of water the temperature rises, whereupon the remainder of the pre-emulsion is dropped in within 15 minutes. A solution of 0.05 part of potassium persulfate in 1.5 parts of water and 30 minutes later a solution of 0.1 part of potassium persulfate in 3 parts of water are added and this addition is repeated 3 more times at intervals of 30 minutes; the batch is then further polymerized for 2 hours.

A thinly liquid, fine emulsion is obtained which contains 39.93% of polymer (theory: 40%). Films cast from this emulsion and dried in air are soluble in trichloroethylene. After having been cured for 5 minutes at 130° C., they have become insoluble in boiling trichloroethylene.

Example 9

A solution of 10 parts of methylene-N-acrylamide-N'-methanesulfonamide (=Monomer A) in 100 parts of water is heated in a flask scavenged with nitrogen to an internal temperature of about 62° C., and a solution of 0.1 part of potassium persulfate in 1 part of water is added. The temperature rises and the homopolymer settles out in the form of a hard, white powder.

Example 10

A solution of 50 parts of methylene-N-acrylamide-N'-para-toluenesulfonamide (=Monomer B) in 200 parts of acetone is heated in a flask scavenged with nitrogen to an internal temperature of about 56° C., and 0.25 part of azoisobutyrodinitrile is added. The polymer settles out; it is brittle and insoluble in boiling trichloroethylene.

Example 11

A pre-emulsion is prepared by vigorously shaking 136.5 parts of vinylacetate, 10.5 parts of methylene-N-methacrylamide-N'-methanesulfonamide [condensation product from methylol methacrylamide and methanesulfonamide =Monomer D], 3 parts of calcium acrylate, 7.5 parts of an emulsifier [adduct from 1 mol of abietylamine and 80 mols of ethylene oxide, esterified with sulfamic acid with addition of urea], 3 parts of an adduct from 9 mols of nonylphenol, and 213 parts of water. One half of this pre-emulsion is then entered in a flask which has been scavenged with nitrogen and is equipped with reflux condenser, thermometer, nitrogen inlet tube and stirrer, and heated to an internal temperature of about 65° C. On addition of a solution of 0.3 part of sodium bisulfite in 3 parts of water and a solution of 0.15 part of potassium persulfate in 4.4 parts of water, the temperature rises, and the remainder of the pre-emulsion is dropped in within 35 minutes. Separately but simultaneously a solution of 0.6 part of potassium persulfate in 17.6 parts of water is dropped in, and the batch is further polymerized for 2 hours, to yield a medium viscous, fine emulsion containing 39.2% of polymed (theory: 40.0%).

Example 12

A pre-emulsion is prepared by vigorously shaking 81 parts of 2-ethylhexyl acrylate, 10 parts of acrylonitrile, 7 parts of methylene - N - methacrylamide - N' - methanesulfonamide [condensation product from methylol methacrylamide and methanesulfonamide=Monomer D], 2 parts of calcium acrylate, 2.5 parts of sodium laurylsulfate, 2.5 parts of sodium α-hydroxyoctadecanesulfonate and 142 parts of water. One half of this pre-emulsion is entered in a flask scavenged with nitrogen and equipped with reflux condenser, thermometer, nitrogen inlet tube and stirred, and heated to an internal temperature of about 66° C. On addition of a solution of 0.2 part of sodium bisulfite in 2 parts of water and of a solution of 0.05 part of potassium persulfate in 1.5 parts of water, the temperature rises, whereupon the remainder of the pre-emulsion is dropped in within 20 minutes. Separately but simultaneously a solution of 0.45 part of potassium persulfate in 13.5 parts of water is added, and the batch is further polymerized for 5 hours, to yield a thinly liquid, fine emulsion containing 37.0% of polymer (theory: 39.9%).

Example 13

A pre-emulsion is prepared by vigorously shaking 45.5 parts of n-butyl acrylate, 45.5 parts of vinyl acetate, 7 parts of methylene-N-acrylamide-N'-chloromethanesulfonamide [condensation product from methylol acrylamide and chloromethanesulfonamide=Monomer G], 2 parts of calcium acrylate, 5 parts of an emulsifier [adduct from 1 mol of abietylamine with 80 mols of ethylene oxide, esterified with sulfamic acid with addition of urea], 2 parts of an adduct from 9 mols of ethylene oxide with 1 mol of nonylphenol, and 143 parts of water. One part of this pre-emulsion is then entered in flask scavenged with nitrogen and equipped with reflux condenser, thermometer, nitrogen inlet tube and stirrer, and heated to an internal temperature of about 63° C.

On addition of a solution of 0.2 part of sodium bisulfite in 2 parts of water and of a solution of 0.05 part of potassium persulfate in 1.5 parts of water, the temperature rises, whereupon the remainder of the pre-emulsion is dropped in within 20 minutes. Separately but simultaneously, a solution of 0.45 part of potassium persulfate in 13.5 parts of water is dropped in, and the batch is further polymerized for 5 hours, to yield a thinly liquid, fine emulsion containing 40.3% of polymer (theory: 40.3%).

Example 14

A pre-emulsion is prepared by vigorously shaking 9.3 parts of n-butyl acrylate, 1.6 parts of vinylidenechloride, 0.78 part of methylene-N-acrylamide-N'-benzylsulfonamide [condensation product from methylol acrylamide and benzylsulfonamide=Monomer H], 0.24 part of calcium acrylate, 0.56 part of sodium laurylsulfate, 0.56 part of sodium phenyldodecylsulfonate and 120 parts of water. This pre-emulsion is entered in a flask scavenged with nitrogen and equipped with reflux condenser, thermometer, nitrogen inlet tube and stirrer, and heated to an internal temperature of about 75° C. On addition of a solution of 0.05 part of potassium persulfate in 1.4 parts of water the temperature rises, whereupon a pre-emulsion consisting of 103 parts of n-butylacrylate, 17.8 parts of vinylidenechloride, 8.6 parts of methylene-N-acrylamide-N'-benzylsulfonamide [condensation product from methylol acrylamide and benzylsulfonamide=Monomer H], 2.64 parts of calcium acrylate, 3.04 parts of sodium laurylsulfate, 3.04 parts of sodium phenyldodecylsulfonate and 42 parts of water is dropped in within 20 minutes. Separately but simultaneously, a solution of 0.45 part of potassium persulfate in 12.6 parts of water is dropped in, and the batch is further polymerized for 3 hours, to yield a thinly liquid, fine emulsion containing 45.5% of polymer (theory: 46.4%).

Example 15

A pre-emulsion is prepared by vigorously shaking 90 parts of n-butylacrylate, 7 parts of methylene-N-acrylamide-N' - methanesulfonamide [condensation product from methylol acrylamide and methanesulfonamide =Monomer A], 3 parts of acrylic acid, 5 parts of an emulsifier [adduct of 1 mol of abietylamine with 80 mols of ethylene oxide, esterified with sulfamic acid with addition of urea], 2 parts of an adduct of 9 mols of ethylene oxide with 1 mol of nonylphenol and 140 parts of water. One half of this pre-emulsion is then entered in a flask scavenged with nitrogen and equipped with reflux condenser, thermometer, nitrogen inlet tube and stirrer; at an internal temperature of about 18° C., 0.36 part of hydrogen peroxide (35%), 0.072 part of ascorbic acid dissolved in 1.8 parts of water and 1.8 parts of a considerably diluted ferroammonium sulfate solution (0.00025 part of $Fe(NH_4)_2(SO_4)_2.6H_2O$) are added, whereupon the temperature rises and the remainder of the pre-emulsion is dropped in within 20 minutes. Separately but simultaneously, 1.44 parts of hydrogen peroxide (35%), 0.288 part of ascorbic acid dissolved in 7.2 parts of water, and 7.2 parts of a considerably dilute solution of ferroammonium sulfate (0.0018 part of $$Fe(NH_4)_2(SO_4)_2.6H_2O)$$

are dropped in. The batch is then further polymerized for 2 hours, to yield a medium viscous, fine emulsion containing 40.0% of polymer (theory: 40.2%).

Example 16

A pre-emulsion is prepared by vigorously shaking 60 parts of n-butyl acrylate, 30 parts of acrylonitrile, 7 parts of methylene - N - methacrylamide-N'-para-toluenesulfonamide [condensation product from methylol methacrylamide and para-toluenesulfonamide=Monomer E], 3 parts of acrylic acid, 5 parts of an emulsifier [adduct from 1 mol of abietylamine with 80 mols of ethylene oxide, esterified with sulfamic acid with addition of urea], 2 parts of an adduct of 9 mols of ethylene oxide with 1 mol of nonylphenol, 0.3 part of triethanolamine and 145 parts of water. One half of this pre-emulsion is entered in a flask scavenged with nitrogen and equipped with reflux condenser, thermometer, nitrogen inlet tube and stirrer, and heated to an internal temperature of about 65° C. On addition of a solution of 0.2 part of sodium bisulfite in 2 parts of water and of a solution of 0.05 part of potassium persulfate in 1.5 parts of water, the temperature rises and the remainder of the pre-emulsion is dropped in within 25 minutes. Separately but simultaneously, a solution of 0.45 part of potassium persulfate in 13.5 parts of water is dropped in, and the batch is further polymerized for 2 hours, to yield a thinly liquid, fine emulsion containing 39.4% of polymer (theory: 40.0%).

Example 17

A pre-emulsion is prepared by vigorously shaking 129 parts of vinylidenechloride, 16.5 parts of methylacrylate, 4.5 parts of methylene-N-crotonamide-N'-methanesulfonamide [condensation product from methylol crotonamide and methanesulfonamide=Monomer F], 3.75 parts of sodium laurylsulfate, 3.75 parts of sodium phenyldodecylsulfonate and 215 parts of water; this pre-emulsion is entered in a flask scavanged with nitrogen and equipped with reflux condenser, nitrogen inlet tube, thermometer and stirrer and heated to an internal temperature of about 33° C. On addition of 0.3 part of sodium bisulfite in 3 parts of water and of 0.15 part of ammonium persulfate in 3 parts of water the temperature rises. The addition of the ammonium persulfate solution is repeated 9 more times at intervals of 30 minutes. The bath temperature is then raised to 50° C. and the batch is further polymerized for 2 hours, to yield a thinly liquid, fine emulsion containing 37.5% of polymer (theory: 39.0%).

Example 18

A solution of 5 parts of methylene-N-acrylamide-N'-chloromethanesulfonamide [condensation product from methylol acrylamide and chloromethanesulfonamide =Monomer G] in 95 parts of water is heated in a stirring flask scavenged with nitrogen to an internal temperature of about 65° C., and a solution of 0.1 part of potassium persulfate in 5 parts of water is added. The temperature rises and the hard homopolymer settles out.

Example 19

A solution of 5 parts of methylene-N-methacrylamide-N'-methanesulfonamide [condensation product from methylol methacrylamide and methanesulfonamide =Monomer D] in 95 parts of water is heated in a stirring flask scavenged with nitrogen to an internal temperature of about 65° C., and a solution of 0.1 part of potassium persulfate in 5 parts of water is added. The temperature rises and the hard homopolymer settles out.

Example 20

A solution of 5 parts of methylene-N-crotonamide-N'-methanesulfonamide (condensation product from methylol crotonamide and methanesulfonamide=Monomer F) in 95 parts is heated in a stirring flask scavenged with nitrogen to an internal temperature of about 65° C. On addition of 0.1 part of potassium persulfate in 5 parts of water the temperature rises. After having removed the water, a soft, smeary polymer is obtained.

Example 21

A solution of 5 parts of methylene -N-methacrylamide-N'-para-toluenesulfonamide [condensation product from methylol methacrylamide and para-toluenesulfonamide= Monomer E] in 95 parts of acetone is heated in a stirring flask scavenged with nitrogen to an internal temperature of about 56° C., and 0.1 part of benzoyl peroxide is added, whereupon the polymer settles out in the form of a powder.

Example 22

A solution of 5 parts of methylene-N-acrylamide-N'-benzylsulfonamide [condensation product from methylol acrylamide and benzylsulfonamide=Monomer H] in 95 parts of acetone is heated in a stirring flask scavenged with nitrogen to an internal temperature of about 56° C., and 0.1 part of benzoyl peroxide is added. The polymer settles out in powder form.

Example 23

A thickening emulsion is prepared from:
Grams/litre
150    aqueous emulsion containing
        46.7% of the copolymer of Example 6 from
        65 parts of n-butylacrylate
        30 parts of acrylonitrile and
        5 parts of methylene-N-acrylamide-N'-para-toluenesulfonamide
225    water
625    heavy petroleum fraction 1000 g. of a pasty emulsion (binder)
This binder is used to prepare the following printing ink:
32 g. of pigment paste (containing 32% of the azo pigment of the formula

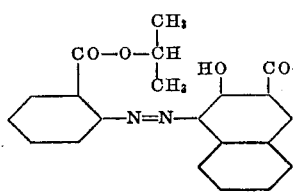

30% of etherified polymethylolmelamine with polyethyleneglycol 4000 and n-butanol and 28% of water)
948 g. of the above emulsion and
20 g. of a 30% solution of $(NH_4)_2HPO_4$ 1000 g. of printing ink.

A cotton and a spun rayon fabric are printed with the printing ink by the screen printing process, dried and cured for 5 minutes at 150° C.

The abrasion test of the dry and the wet fabrics, as well as the trichloroethylene test and the scrubbing test (with a soap+soda solution) give very good results.

Example 24

A cotton fabric is dressed with the following preparation:

Grams/litre
120   50% aqueous solution of methylolmelamine methyl ether and dimethylol ethyleneurea dimethyl ether
30   20% polyethylene emulsion
60   aqueous emulsion containing 33.6% of the copolymer of Example 2 from 80 parts of n-butyl acrylate
     15 parts of vinylidenechloride
     5 parts of methylene-N-acrylamide-N'-paratoluenesulfonamide
15   magnesium chloride
     citric acid to establish a pH value of 5.5.

The cotton fabric is padded, squeezed to a weight increase of 60%, dried at 80° C., cured for 4½ minutes at 150 to 160° C., rinsed in cold water for 5 minutes, and then washed for 10 minutes at 40° C. with a solution containing, per litre, 5 g. of sodium metaphosphate and 2 g. of the condensation product of 1 mol of para-nonylphenol with 9 mols of ethylene oxide. The dressed cotton fabric displays a distinct improvement of the crease angle compared with the untreated fabric.

Example 25

A cotton fabric is dressed with the following preparation:

Grams/litre
150   50% aqueous solution of a polymethylolmelamine methyl ether and dimethylol ethyleneurea dimethyl ether,
250   aqueous emulsion containing 39.2% of the copolymer of Example 11 and 91 parts of vinyl acetate, 7 parts of methylene-N-methacrylamide-N'-methanesulfonamide and 2 parts of calcium acrylate and
18   magnesium chloride.

The cotton fabric is padded, squeezed to a weight increase of 70%, dried on a tenter at 80° C. and cured for 4 minutes 30 seconds at 150 to 160° C. The treated fabric displays a very good stiffness effect. One half of the dressed fabric is boiled 5 times for 30 minutes with a solution, containing per litre, 5 g. of soap and 2 g. of soda. The stiff dressing is resistant to washing.

Example 26

Fabrics of cotton, polyester+cotton, polyester and polyamide fibres are dressed with the following preparation:

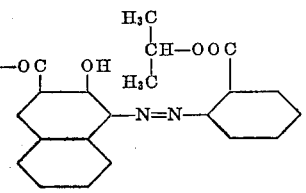

Grams/litre
32 aqueous emulsion containing 37.0% of the copolymer of Example 12 from 81 parts of 2-ethylhexyl acrylate, 10 parts of acrylonitrile, 7 parts of methylene - N - methacrylamide - N' - methanesulfonamide,
2 parts of calcium acrylate,
20 sodium alginate solution of 5% strength,
15 75% aqueous solution of a condensation product from hexamethylolmelamine and methanol
5 diammonium phosphate,
2 20% aqueous dispersion of α-copper phthalocyanine, which further contains 20% of a methylolmelamine etherified with butanol and a dispersant,
2 20% aqueous dispersion of gas soot, which further contains 20% of a methylolmelamine etherified with butanol, 10% of phthalic acid dioctyl ester and a dispersant.

The test fabrics are impregnated with the preparation, padded, squeezed to a weight increase of 60 to 70%, dried and cured for 5 minutes at 150° C. The dressed fabrics gave very good results in the following tests: Abrasion in the wet and the dry state, trichloroethylene test and washing in soap solution.

*Example 27*

A thickening emulsion was prepared from:
Grams/litre
10  adduct of 1 mol of hydroabietyl alcohol with 100 mols of ethylene oxide, cross-linked with diphenylmethane diisocyanate,
290  water,
700  lacquer benzine, 1000 g. thickening emulsion.
Preparing the pigment paste:
Grams/litre
400  finely dispersed red pigment of the formula

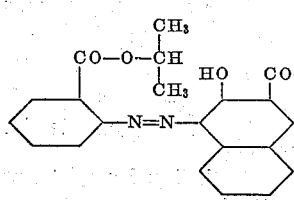 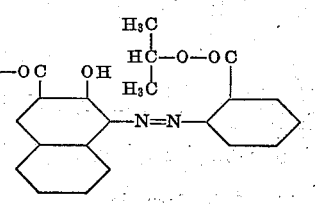

133  adduct of 1 mol of oleyl alcohol with 80 mols of ethylene oxide,
467  water 1000 g. pigment paste, which was used for preparing the following printing ink:
Grams/litre
60  pigment paste,
150  aqueous emulsion containing 39.4% of the copolymer of Example 16 from 60 parts of n-butyl acrylate, 30 parts of acrylonitrile, 7 parts of methylene - N-methacrylamide-N'-para-toluenesulfonamide, 3 parts of acrylic acid,
750  thickening emulsion,
40  water 1000 g. printing ink.

This printing ink was printed by the screen printing method on coton fabrics and spun rayon fabrics, which were then dried and cured for 5 minutes at 150° C.

The dry and wet abrasion test and the scrubbing test (scrubbing with a soap+soda solution) gave very good results.

*Example 28*

Cotton fabric was dressed with the following preparation:
Grams/litre
120  50% aqueous solution of methylolmelamine methyl ether and dimethylol ethyleneurea dimethyl ether,
30  20% polyethylene emulsion,
50  aqueous emulsion containing 40% of the copolymer of Example 15 from 90 parts of n-butyl acrylate, 7 parts of methylene-N-acrylamide-N'-methanesulfonamide and 3 parts of acrylic acid,
15  magnesium chloride,
citric acid to establish a pH of 5.5

The cotton fabric is padded, squeezed to a weight increase of 60%, dried at 80° C. and then cured for 4½ minutes at 150 to 160° C., rinsed for 5 minutes in cold water and then for 10 minutes at 40° C. in a solution containing, per litre, 3 g. of sodium metaphosphate and 1 g. of the condensation product of 1 mol of para-nonylphenol with 9 mols of ethylene oxide. The dressed fabric displays a distinct improvement of the crease angle compared with the untreated fabric. The scrubbing test values are likewise very good. One half of the dressed fabric was boiled 5 times for 30 minutes in a solution containing, per litre, 5 g. of soap and 2 g. of soda. The specimens treated in this manner displayed practically no impairment of their fastness values.

*Example 29*

A nylon fabric was coated with the following brushing paste:
Parts
75  of an aqueous emulsion containing 45.5% of the copolymer of Example 14 from 78 parts of n-butyl acrylate, 13.5 parts of vinylidenechloride, 6.5 parts of methylene-N-acrylamide-N'-benzylsulfonamide and 2 parts of calcium acrylate,
1  of methylcellulose,
24  of water, and
1  of ammonium chloride.

The fabric is coated with the brushing paste, dried at 80° C. once more coated with the paste, dried at 80° C. and cured for 5 minutes at 150° C. The nylon fabric dressed in this manner displays very good fastness to trichloroethylene and washing.

What is claimed is:
1. A polymerization product from
(a) 2 to 100% of a carbonamide of the formula

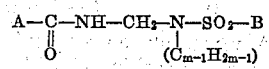

wherein A represents an ethylenically unsaturated radical of the composition $C_{n+1}H_{2n+1}$ in which $n$ is a whole number of at the most 2, B represents a radical that contains at most 10 carbon atoms and $m$ represents a whole number of at the most 4, and
(b) 98 to 0% of another copolymerizable ethylenically unsaturated monomer.

2. A polymerization product from
(a) 4 to 8% of a carbonamide of the formula

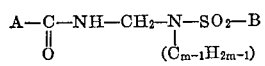

wherein A represents an ethylenically unsaturated radical of the composition $C_{n+1}H_{2n+1}$ in which $n$ is a whole number of at the most 2, B represents a member selected from the group consisting of a methyl group, a methylphenyl group, a benzyl group and a chloromethyl group, and $m$ represents a whole number of at the most 4, and
(b) 96 to 92% of at least one other copolymerizable ethylenically unsaturated monomer selected from the group consisting of an alkyl acrylate, vinyl acetate, vinylidenechloride, calcium acrylate, diethylaminopropyl acrylamide, acrylonitrile and acrylic acid.

3. A polymerization product from
(a) 4 to 8% of methylene-N-acrylamide-N'-paratoluenesulfonamide and
(b) 96 to 92% of n-butyl acrylate and vinylidene chloride.

4. A polymerization product from
(a) 4 to 8% of methylene-N-acrylamide-N'-paratoluenesulfonamide and
(b) 96 to 92% of n-butyl acrylate and acrylonitrile.

5. A polymerization product from
(a) 4 to 8% of methylene-N-methacrylamide-N'-methanesulfonamide and
(b) 96 to 92% of vinylacetate and calcium acrylate.

6. A polymerization product from
(a) 4 to 8% of methylene-N-methacrylamide-N'-methanesulfonamide and
(b) 96 to 92% of 2-ethylhexyl acrylate, acrylonitrile and calcium acrylate.

7. A polymerization product from
(a) 4 to 8% of methylene-N-acrylamide-N'-benzylsulfonamide and
(b) 96 to 92% of n-butylacrylate, vinylidene chloride and calcium acrylate.

8. A polymerization product from
(a) 4 to 8% of methylene-N-acrylamide-N'-methanesulfonamide and
(b) 96 to 92% of n-butylacrylate and acrylic acid.

9. A polymerization product from
(a) 4 to 8% of methylene-N-methacrylamide-N'-paratoluenesulfonamide and
(b) 96 to 92% of n-butyl acrylate, acrylonitrile and acrylic acid.

10. A carbonamide of the formula

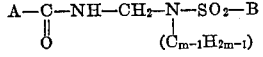

wherein A represents an ethylenically unsaturated radical of the composition $C_{n+1}H_{2n+1}$ in which $n$ is a whole number of at the most 2, B represents a radical that contains at most 10 carbon atoms and $m$ represents a whole number of at the most 4.

11. A process for the manufacture of impregnations and coatings on porous materials which comprises applying to said materials a preparation containing a polymerization product from
(a) 2 to 100% of carbonamide of the formula

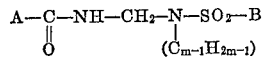

wherein A represents an ethylenically unsaturated radical of the composition $C_{n+1}H_{2n+1}$ in which $n$ is is a whole number of at the most 2, B represents a radical that contains at most 10 carbon atoms and $m$ represents a whole number of at the most 4, and
(b) 98 to 0% of another copolymerizable ethylenically unsaturated monomer.

12. A process as claim in claim 11 for the manufacture of impregnations and coatings on porous materials which comprises applying to said materials a preparation containing a polymerization product from
(a) 4 to 8% of a carbonamide of the formula

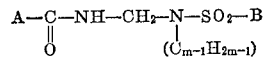

wherein A represents an ethylenically unsaturated radical of the composition $C_{n+1}H_{2n+1}$ in which $n$ is a whole number of at the most 2, B represents a member selected from the group consisting of a methyl group, a methylphenyl group, a benzyl group and a chloromethyl group, and $m$ represents a whole number of at the most 4, and
(b) 96 to 92% of at least one other copolymerizable ethylenically unsaturated monomer selected from the group consisting of an alkyl acrylate, vinyl acetate, vinylidenechloride, calcium acrylate, diethylaminopropyl acrylamide, acrylonitrile and acrylic acid.

13. A process as claimed in claim 11 for the manufacture of impregnations and coatings on porous materials which comprises applying to said materials a preparation containing a polymerization product from
(a) 4 to 8% of methylene-N-acrylamide-N'-paratoluene-sulfonamide and
(b) 96 to 92% of n-butyl acrylate and vinylidene chloride.

14. A process as claimed in claim 11 for the manufacture of impregnations and coatings on porous materials which comprises applying to said materials a preparation containing a polymerization product from
(a) 4 to 8% of methylene-N-acrylamide-N'-paratoluene-sulfonamide and
(b) 96 to 92% of n-butyl acrylate and acrylonitrile.

15. A process as claimed in claim 11 for the manufacture of impregnations and coatings on porous materials which comprises applying to said materials a preparation containing a polymerization product from
(a) 4 to 8% of methylene-N-methacrylamide-N'-methane-sulfonamide and
(b) 96 to 92% of vinylacetate and calcium acrylate.

16. A process as claimed in claim 11 for the manufacture of impregnations and coatings on porous materials which comprises applying to said materials a preparation containing a polymerization product from
(a) 4 to 8% of methylene-N-methacrylamide-N'-methane-sulfonamide and
(b) 96 to 92% of 2-ethylhexyl acrylate, acrylonitrile and calcium acrylate.

17. A process as claimed in claim 11 for the manufacture of impregnations and coatings on porous materials which comprises applying to said materials a preparation containing a polymerization product from
(a) 4 to 8% of methylene-N-acrylamide-N'-benzylsulfonamide and
(b) 96 to 92% of n-butylacrylate, vinylidene chloride and calcium acrylate.

18. A process as claimed in claim 11 for the manufacture of impregnations and coatings on porous materials which comprises applying to said materials a preparation containing a polymerization product from
(a) 4 to 8% of methylene-N-acrylamide-N'-methanesulfonamide and
(b) 96 to 92% of n-butylacrylate and acrylic acid.

References Cited

UNITED STATES PATENTS 2,478,378   8/1949   Dickey _____ 260—556

JOSEPH L. SCHOFER, *Primary Examiner.*

DANIEL K. DENENBERG, *Assistant Examiner.*